(12) United States Patent
Tao et al.

(10) Patent No.: US 12,041,579 B2
(45) Date of Patent: Jul. 16, 2024

(54) METHOD AND APPARATUS FOR COMMUNICATION BETWEEN A TERMINAL AND A SERVER

(71) Applicant: ALIBABA GROUP HOLDING LIMITED, Grand Cayman (KY)

(72) Inventors: Zhen Tao, Hangzhou (CN); Xiaobo Yu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 386 days.

(21) Appl. No.: 17/443,153

(22) Filed: Jul. 21, 2021

(65) Prior Publication Data
US 2021/0352614 A1    Nov. 11, 2021

Related U.S. Application Data

(63) Continuation of application No. PCT/CN2020/071688, filed on Jan. 13, 2020.

(30) Foreign Application Priority Data

Jan. 21, 2019  (CN) .......................... 201910053642.0

(51) Int. Cl.
*H04W 64/00*   (2009.01)
*H04W 8/24*    (2009.01)
(Continued)

(52) U.S. Cl.
CPC ........... *H04W 64/006* (2013.01); *H04W 8/24* (2013.01); *H04W 72/0446* (2013.01); *H04W 72/12* (2013.01); *H04W 72/23* (2023.01)

(58) Field of Classification Search
None
See application file for complete search history.

(56) References Cited

U.S. PATENT DOCUMENTS

| 8,902,839 B2 | 12/2014 | Forssell |
| 2012/0317652 A1 | 12/2012 | Kiley et al. |

(Continued)

FOREIGN PATENT DOCUMENTS

| CN | 101909322 A | 12/2010 |
| CN | 104811921 A | 7/2015 |

(Continued)

OTHER PUBLICATIONS

European Patent Office Communication issued for Application No. 20746011.4 the Supplementary European Search Report (Art. 153(7) EPC) and the European search opinion dated Sep. 8, 2022, 12 pages.

(Continued)

*Primary Examiner* — Frantz Bataille
(74) *Attorney, Agent, or Firm* — Finnegan, Henderson, Farabow, Garrett & Dunner, LLP (57) ABSTRACT

Embodiments of the present disclosure provide methods and devices for communication by a terminal. The method can include: sending a first message to a server, the first message comprising command information, the command information comprising first state information of the terminal, and the first state information comprising at least one of mobile attribute information, moving state information, mobile state start information, stationary state start information, or moving direction state information, wherein the mobile attribute information is used to indicate that the terminal is a mobile terminal, the moving state information is used to indicate that the terminal is in a mobile state, the mobile state start information is used to indicate a transition of the terminal from a stationary state to a mobile state, the stationary state start information is used to indicate a transition of the terminal from a mobile state to a stationary state, and the moving direction information is used to indicate direction information of movement of the terminal; and receiving a (Continued)

second message sent by the server, wherein the second message is used to confirm the at least one of first state information in the command information.

17 Claims, 4 Drawing Sheets

(51) Int. Cl.
*H04W 72/0446* (2023.01)
*H04W 72/12* (2023.01)
*H04W 72/23* (2023.01)

(56) References Cited

U.S. PATENT DOCUMENTS

| | | | |
|---|---|---|---|
| 2013/0244711 A1* | 9/2013 | Burckart | H04W 8/14 455/507 |
| 2017/0127397 A1 | 5/2017 | Hahn et al. | |
| 2018/0041883 A1* | 2/2018 | Choi | H04B 5/72 |
| 2018/0124646 A1 | 5/2018 | Thubert et al. | |
| 2018/0184465 A1 | 6/2018 | Chatterjee | |
| 2018/0343659 A1 | 11/2018 | Hahn et al. | |

FOREIGN PATENT DOCUMENTS

| | | |
|---|---|---|
| CN | 105933853 A | 9/2016 |
| CN | 107920328 A | 4/2018 |
| CN | 109194774 A | 1/2019 |
| CN | 110324847 A | 10/2019 |
| TW | 201642689 A | 12/2016 |
| WO | WO 2020/151514 A1 | 7/2020 |

OTHER PUBLICATIONS

PCT International Search Report and Written Opinion mailed Apr. 17, 2020, issued in corresponding International Application No. PCT/CN2020/071688 (20 pgs.).

First Chinese Search Report issued in corresponding Chinese Application No. 201910053642.0 on Jul. 23, 2021 (2 pages).

* cited by examiner

The terminal sends a first message to the server, the first message including command information, the command information including first state information, and the first state information including at least one of mobile attribute information, moving state information, mobile state start information, stationary state start information, and moving direction state information, wherein the mobile attribute information is used to indicate that the terminal is a mobile terminal, the moving state information is used to indicate that the terminal is currently in a moving state, the mobile state start information is used to indicate that the terminal is currently being switched from a stationary state to a mobile state, the stationary state start information is used to indicate that the terminal is currently being switched from a moving state to a stationary state, and the moving direction information is used to indicate direction information of the terminal's movement ⎯ 101

The terminal receives a second message sent by the server, wherein the second message is used to confirm the at least one type of first state information in the first command information ⎯ 102

*FIG. 1*

201 — The server receives a first message sent by the server, the first message including command information, the command information including first state information, and the first state information including at least one of mobile attribute information, moving state information, mobile state start information, stationary state start information, and moving direction state information, wherein the mobile attribute information is used to indicate that the terminal is a mobile terminal, the moving state information is used to indicate that the terminal is currently in a moving state, the mobile state start information is used to indicate that the terminal is currently being switched from a stationary state to a mobile state, the stationary state start information is used to indicate that the terminal is currently being switched from a moving state to a stationary state, and the moving direction information is used to indicate direction information of the terminal's movement 202 — The server sends a second message to the terminal, wherein the second message is used to confirm the at least one type of first state information in the first command information

*FIG. 2*

| Bit | 4-6 | 3 | 2 | 1 | 0 |
|---|---|---|---|---|---|
| State | RFU | Stationary attribute start information | Mobile attribute start information | Moving state information | Moving attribute information |

METHOD AND APPARATUS FOR COMMUNICATION BETWEEN A TERMINAL AND A SERVER

CROSS-REFERENCE TO RELATED APPLICATION

The present disclosure claims the benefits of priority to International Application No. PCT/CN2020/071688, filed on Jan. 13, 2020, which claims priority to Chinese Patent Application No. 201910053642.0, filed on Jan. 21, 2019, both of which are incorporated herein by reference in their entireties.

BACKGROUND

Internet of Things technology is the third information technology revolution after computers and the Internet. Advantages of Internet of Things technologies include real-time performance and interactivity. The Internet of Things technologies have been widely used in various fields such as urban management, digital homes, positioning and navigation, logistics management, and security systems. Long Range (LoRa) is a low-power long-distance wireless transmission scheme based on a spread spectrum technology. The characteristics of LoRa include long transmission distance, low power consumption, multiple nodes, and low cost.

A LoRa network usually includes a terminal, a base station, and a server. In some conventional systems, a server considers mobility information of a terminal in some resource scheduling mechanisms. For example, in an Adaptive Data Rate (ADR) mechanism, if a terminal device is mobile, it is not recommended to use the ADR mechanism, but the terminal device's own data rate adjustment strategy is adopted.

However, in some conventional systems, a server cannot know mobility-related information of the terminal. Accordingly, the server cannot timely adopt corresponding network scheduling strategies according to changes in a mobility-related state of the terminal.

SUMMARY

Embodiments of the present disclosure provide methods and devices for communication by a terminal. The method can include: sending a first message to a server, the first message comprising command information, the command information comprising first state information of the terminal, and the first state information comprising at least one of mobile attribute information, moving state information, mobile state start information, stationary state start information, or moving direction state information, wherein the mobile attribute information is used to indicate that the terminal is a mobile terminal, the moving state information is used to indicate that the terminal is in a mobile state, the mobile state start information is used to indicate a transition of the terminal from a stationary state to a mobile state, the stationary state start information is used to indicate a transition of the terminal from a mobile state to a stationary state, and the moving direction information is used to indicate direction information of movement of the terminal; and receiving a second message sent by the server, wherein the second message is used to confirm the at least one of first state information in the command information.

DETAILED DESCRIPTION

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

A LoRa network is composed of a terminal node, a base station node, and a server. A terminal has a LoRa network connection capability and joins the LoRa network. According to different application scenarios where the LoRa network is deployed, the terminal can include different electronic devices. For example, when the LoRa network is applied to city management, the terminal can include a smart meter; when the LoRa network is applied to a digital home, the terminal can include various smart home appliances, and so on.

A base station, also referred to as a gateway or a concentrator in the LoRa network, has the function of wireless connection convergence, including providing the terminal with an access to the LoRa network, forwarding data from the server or the terminal, and achieving data interaction between the terminal and the server. The base station can also conduct data interaction with other base stations within a signal coverage area of the base station by transmitting radio frames.

The server can include a server or a server cluster, which is used to perform service processing according to data obtained from the base station or the terminal and to control a working mode and a working state of the base station or the terminal.

As described above, a server is not necessarily informed of changes of mobility states of a terminal, therefore it is difficult for the server to timely adjust network scheduling strategies according to current mobility states of the terminal. The embodiments of the present disclosure provide technical solutions where the server can timely obtain state information related to mobility of the terminal device, and the server can adopt a corresponding network scheduling strategy when necessary. The technical solutions aim at avoiding wasting network resources and improving the interaction efficiency between the terminal and the server.

In some embodiments, a terminal informs a server of corresponding mobility state information of the terminal through Medium Access Control (MAC) command information or other forms of uplink notification information. The server selects a corresponding network scheduling strategy according to the received different terminal mobility state information.

An exemplary process of information synchronization is introduced first below from the perspective of a terminal.

Figure 1:
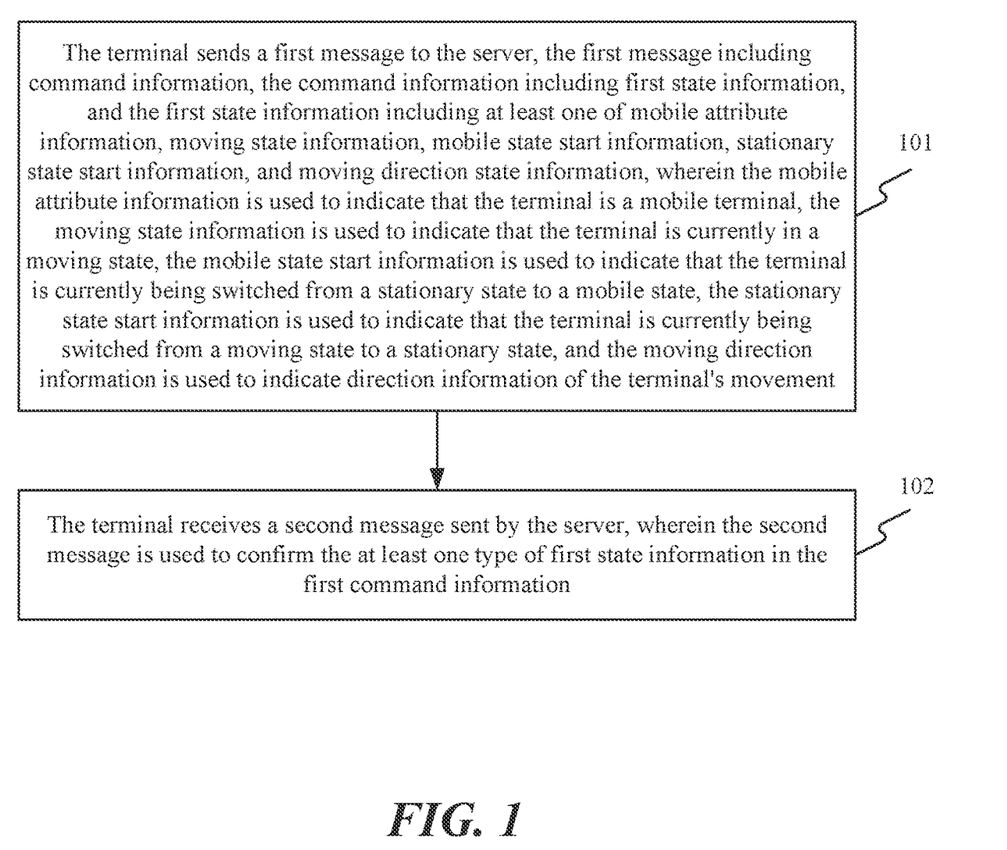
FIG. 1 is a flow chart of an exemplary method for communication by a terminal, consistent with some embodiments of the present disclosure.

FIG. 1 is a flow chart of an exemplary method for communication by a terminal, consistent with some embodiments of the present disclosure. The method can include the following steps.

In Step 101, the terminal sends a first message to the server, the first message including command information having first state information. The first state information can include at least one of mobile attribute information, stationary attribute information, moving state information, stationary state information, mobile state start information, stationary state start information, and moving direction state information, wherein the mobile attribute information is used to indicate that the terminal is a mobile terminal, the stationary attribute information is used to indicate that the terminal is a stationary terminal, the moving state information is used to indicate that the terminal is currently in a mobile state, the stationary state information is used to indicate that the terminal is currently in a stationary state, the mobile state start information is used to indicate that the terminal is currently being switched from a stationary state to a mobile state, the stationary state start information is used to indicate that the terminal is currently being switched from a mobile state to a stationary state, and the moving direction information is used to indicate direction information of the terminal's movement.

Figure 3:
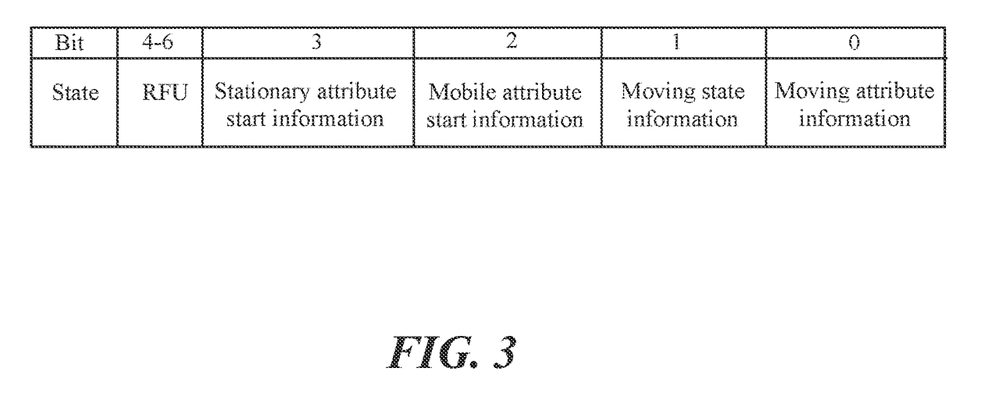
FIG. 3 is a schematic diagram of an exemplary payload part of a terminal mobility indication command, consistent with some embodiments of the present disclosure.

Specifically, the terminal is a LoRaWAN terminal. The server is a LoRaWAN server. The first message is any uplink data frame. The command information is a MAC Command. For example, the MAC command can be a terminal mobility indication (Device Mobility Indication, DevMobilityInd) command. The terminal mobility indication command can include one or more pieces of state information (StateInfo). FIG. 3 shows a payload part of a terminal mobility indication command. Bit 0 represents whether the terminal is a terminal with a mobile attribute. For example, if the value of bit 0 is 1, it indicates that the terminal is a terminal with a mobile attribute. For example, the mobile terminal can be a terminal with a mobile attribute such as a shared bicycle, a smart logistics vehicle, and an unmanned aerial vehicle. If the value of bit 0 is 0, it indicates that the terminal is a stationary terminal. Bit 1 represents whether the terminal is currently in a stationary state. If the value of bit 1 is 1, it indicates that the terminal is currently in a stationary state. In contrast, if the value of bit 1 is 0, it indicates that the terminal is currently in a mobile state. Bit 2 represents whether the terminal starts to move from being stationary. For example, if the value of bit 2 is 1, it indicates that the terminal will start to transition from a stationary state to a mobile state. In contrast, it indicates that the terminal will continue to remain stationary. The terminal in LoRa networks is also referred to as "a node." When a network side (e.g., the server) learns that the terminal changes from a stationary state to a mobile state, the network side switches a scheduling strategy for the node, for example, adjusting output power of the node to the maximum to achieve maximum reliability and reduce energy saving requirements, or stopping dynamic scheduling of the node. Bit 3 indicates whether the terminal changes from moving to stationary. For example, if the value of bit 3 is 1, it indicates that the terminal will start to transition from a mobile state to a stationary state. The network side learns that the terminal changes from a mobile state to a stationary state, and the network side switches a scheduling strategy for the terminal, for example, adjusting power to the minimum according to a signal condition of the terminal and the network to achieve the minimum power consumption. Optionally, the state information represented by the bit value 1 or 0 can also be interchanged. For example, when the value of bit 0 is 0, it can also represent that the terminal is a mobile terminal. When the value of bit 0 is 1, it represents that the terminal is a stationary terminal.

Optionally, the terminal mobility indication command can also include terminal moving speed information. For example, bits 4-5 in the above drawing can indicate moving speed information of the terminal. For example, when bits 4-5 are 00, it represents that the terminal is moving at a low speed. When bits 4-5 are 01, it indicates that the terminal is moving at a medium speed. When bits 4-5 are 10, it indicates that the terminal is moving at a high speed. After acquiring the moving speed of the terminal, the server can modify the scheduling strategy for the terminal. For example, when the terminal is in a low-speed state, a transmission period of uplink data frames for updating a downlink base station can be appropriately prolonged. When the terminal is in a medium-speed or high-speed state, the transmission period of uplink data frames for updating the downlink base station can be appropriately shortened.

Optionally, the terminal mobility indication command can also include moving direction information. For example, bits 4-5 in the above drawing can indicate terminal moving direction information. For example, when bits 4-5 are 00, it represents that the terminal is moving northward. When bits 4-5 are 01, it represents that the terminal is moving westward. When bits 4-5 are 10, it represents that the terminal is moving southward. When bits 4-5 are 11, it represents that the terminal is moving eastward. After acquiring the moving direction of the terminal, the server can modify the scheduling strategy for the terminal. For example, after acquiring the location information and moving direction information of the terminal, the server can predict a designated base station that can reach the terminal and send downlink data frames to the terminal through the base station.

Optionally, one terminal mobility indication command can include multiple pieces of state information. For example, in a payload part of the terminal mobility indication command, bits 0 and 2 are both set to 1, indicating that the terminal is a terminal with a mobile attribute, and the terminal will start to transition from a stationary state to a mobile state.

In the LoRa network, the terminal sends the first message to the server through at least one gateway. The gateway can also be referred to as a base station. The first message sent by the terminal can be received by multiple gateways and forwarded to a network server by the multiple gateways.

In some embodiments, the first state information further includes time information about the upcoming transition to a stationary state and time information about the upcoming transition to a mobile state.

Specifically, the time information about the upcoming transition to a stationary state can be calculated in seconds. One bit can be used in the first state information to indicate whether the terminal will transition from a mobile state to a stationary state. Similarly, one bit can also be used in the first state information to indicate whether the terminal will transition from a stationary state to a mobile state. Optionally, the first state information can also include a piece of three-bit information for representing a time required to transition the state. For example, if the first state information carries the information that the terminal is about to transition from a stationary state to a mobile state, and a three-bit value corresponding to the time information is 001, it represents that the terminal will transition from the stationary state to the mobile state in 1 second. The time information can also be represented by more bits, for example, 4 bits. Optionally, each bit can also represent a different time measurement value. For example, the three-bit value corresponding to the time information being 001 can also represent 10 milliseconds. When the three-bit value is 010, it represents 20 milliseconds, and so on.

In some embodiments, the command information can be included in a data frame overhead. Specifically, the MAC command can be included in an overhead (payload) of a downlink data frame.

In some embodiments, the command information can be included in an optional field of a data frame. Specifically, the MAC command can be included in an optional field (FOpts) of an uplink data frame, and the terminal can read the state information related to the terminal mobility contained in the MAC command from the optional field of the uplink data frame.

In some embodiments, the command information can be unencrypted. Specifically, when the MAC command is included in an optional field (FOpts) of a data frame, it can be unencrypted.

In Step 102, the terminal receives a second message sent by the server, wherein the second message is used to confirm the at least one type of first state information in the command information.

Specifically, the second message can be a terminal mobility indication response message (Device Mobility Configuration, DevMobilityConf), and the response message carries confirmation information corresponding to state information on a response bit in the terminal mobility indication command. For example, in the payload of the terminal mobility indication command sent by the terminal to the server, bit 0 is set to 1, indicating that the terminal is a terminal with a mobile attribute. Subsequently, the terminal receives the terminal mobility indication response message sent by the server. The response message contains state information confirmation information. Each bit in the state information confirmation information represents a result of confirmation for state information of a corresponding location. For example, if the value of bit 0 in the state information confirmation information received by the terminal is 1, it represents that the server successfully confirms the state of the terminal. If the corresponding state information confirmation information received by the terminal is 0, it represents that the server fails to confirm the terminal state.

In the LoRa network, the server selects, according to a certain strategy, a gateway for sending a downlink message, and sends the second message to the terminal through the gateway. The strategy of the server for selecting a gateway for sending a downlink message can be that the gateway sends the received Received Signal Strength Indication (RSSI) information of the uplink message sent by the terminal to the network server, and the network server selects, according to the received RSSI information, a gateway with the strongest received signal strength, and sends the second message to the terminal through the gateway.

The server can timely acquire the state information related to mobility of the terminal device, so that the server can adopt a corresponding network scheduling strategy when necessary, thus avoiding wasting network resources and improving the interaction efficiency between the terminal and the server.

Figure 2:
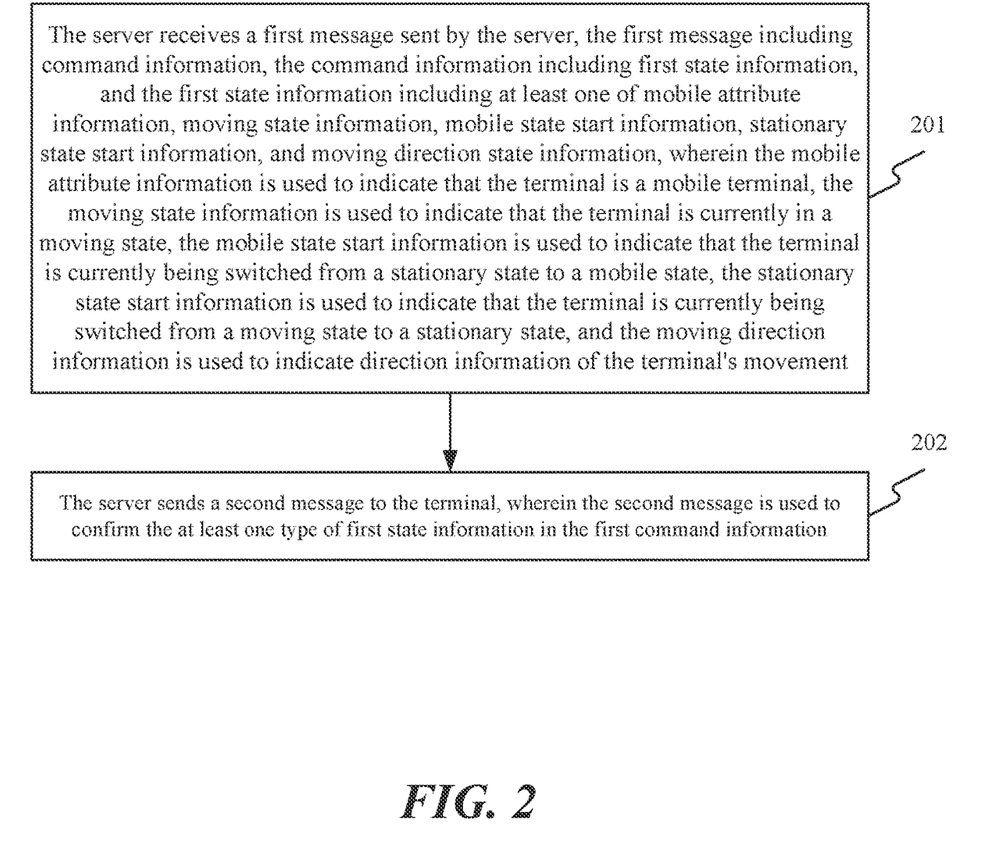
FIG. 2 is a flow chart of an exemplary method for communication by a server, consistent with some embodiments of the present disclosure.

FIG. 2 is a flow chart of an exemplary method for communication by a server, consistent with some embodiments of the present disclosure. The method can include the following steps.

In Step 201, the server receives a first message sent by the terminal. The first message including command information having first state information. The first state information includes at least one of mobile attribute information, stationary attribute information, moving state information, stationary state information, mobile state start information, stationary state start information, and moving direction state information, wherein the mobile attribute information is used to indicate that the terminal is a mobile terminal, the stationary attribute information is used to indicate that the terminal is a stationary terminal, the moving state information is used to indicate that the terminal is currently in a mobile state, the stationary state information is used to indicate that the terminal is currently in a stationary state, the mobile state start information is used to indicate that the terminal is currently being switched from a stationary state to a mobile state, the stationary state start information is used to indicate that the terminal is currently being switched from a mobile state to a stationary state, and the moving direction information is used to indicate direction information of the terminal's movement.

Specifically, the terminal is a LoRaWAN terminal. The server is a LoRaWAN server. The first message is any uplink data frame. The command information is a MAC Command. For example, the MAC command can be a terminal mobility indication (Device Mobility Indication, DevMobilityInd) command. The terminal mobility indication command can include one or more pieces of state information (StateInfo).

FIG. 3 shows an exemplary payload part of the terminal mobility indication command. Bit 0 represents whether the terminal is a terminal with a mobile attribute. For example, if the value of bit 0 is 1, it indicates that the terminal is a mobile terminal. For example, the mobile terminal can be a terminal with a mobility requirement, such as a shared bicycle. If the value of bit 0 is 0, it indicates that the terminal is a stationary terminal. Bit 1 represents whether the terminal is currently in a stationary state. If the value of bit 1 is 1, it indicates that the terminal is currently in a stationary state. In contrast, if the value of bit 1 is 0, it indicates that the terminal is currently in a mobile state. Bit 2 represents whether the terminal starts to move from being stationary. For example, if the value of bit 2 is 1, it indicates that the terminal will start to transition from a stationary state to a mobile state. Otherwise, it indicates that the terminal will continue to remain stationary. When a network side learns that the terminal has changed from the stationary state to the mobile state, the network side switches a scheduling strategy for the node, for example, adjusting power to the maximum to achieve maximum reliability and reduce energy saving requirements, or stopping dynamic scheduling of the node. Bit 3 indicates whether the terminal changes from moving to stationary. For example, if the value of bit 3 is 1, it indicates that the terminal will start to transition from a mobile state to a stationary state. The network side learns that the terminal changes from a mobile state to a stationary state, and the network side switches a scheduling strategy for the terminal, for example, adjusting power to the minimum according to a signal condition of the terminal and the network to achieve the minimum power consumption. Optionally, the state information represented by the bit value 1 or 0 can also be interchanged. For example, when the value of bit 0 is 0, it can also represent that the terminal is a mobile terminal. When the value of bit 0 is 1, it represents that the terminal is a stationary terminal.

In some embodiments, the command information further includes time information about the upcoming transition to a stationary state and time information about the upcoming transition to a mobile state.

Specifically, the time information about the upcoming transition to a stationary state can be calculated in seconds. One bit can be used in the first state information to indicate whether the terminal will transition from a mobile state to a stationary state. Similarly, one bit can also be used in the first state information to indicate whether the terminal will transition from a stationary state to a mobile state. Optionally, the first state information can also include a piece of three-bit information for representing a time required to transition the state. For example, if the first state information carries the information that the terminal is about to transition from a stationary state to a mobile state, and a three-bit value corresponding to the time information is 001, it represents that the terminal will transition from the stationary state to the mobile state in 1 second. The time information can also be represented by more bits, for example, 4 bits. Optionally, each bit can also represent a different time measurement value. For example, the three-bit value corresponding to the time information being 001 can also represent 10 milliseconds. When the three-bit value is 010, it represents 20 milliseconds, and so on.

In some embodiments, the server updates corresponding second state information according to the first state information, wherein the second state information is used for the server to perform a network scheduling operation.

Specifically, the second state information is state information of the terminal recorded by the server. The second state information can also include at least one of mobile attribute information, stationary attribute information, moving state information, stationary state information, mobile state start information, stationary state start information, and moving direction state information. After updating the state information, the server can perform a specific network scheduling operation according to the updated state information. For example, when the network server learns that the terminal changes from a stationary state to a mobile state, the server can switch the scheduling strategy for the node, adjust the power to the maximum to achieve the maximum reliability and reduce energy saving requirements, or stop dynamic scheduling for the node. When the network side learns that the terminal changes from a mobile state to a stationary state, the network side switches the scheduling strategy for the node, for example, adjusting power to the minimum according to a signal condition of the terminal and the network to achieve the minimum power consumption. When the network server acquires information that the terminal is a terminal with a mobile attribute, the network server can allocate a specific downlink channel to the terminal, so that the terminal can also use the channel to receive downlink data frames sent by other base stations when it moves to other base stations.

In some embodiments, the command information can be included in a data frame overhead.

Specifically, the MAC command can be included in an overhead (payload) of a downlink data frame.

In some embodiments, the command information can be included in an optional field of a data frame.

Specifically, the MAC command can be included in an optional field (FOpts) of an uplink data frame, and the terminal can read the state information related to the terminal mobility contained in the MAC command from the optional field of the uplink data frame.

In some embodiments, the command information can be unencrypted.

Specifically, when the MAC command is included in an optional field (FOpts) of a data frame, it can be unencrypted.

In Step 202, the server sends a second message to the terminal, wherein the second message is used to confirm the at least one type of first state information in the command information.

Specifically, the second message can be a terminal mobility indication response message (Device Mobility Configuration, DevMobilityConf), and the response message carries confirmation information corresponding to state information on a response bit in the terminal mobility indication command. For example, in the payload of the terminal mobility indication command sent by the terminal to the server, bit 0 is set to 1, indicating that the terminal is a terminal with a mobile attribute. Subsequently, the terminal receives the terminal mobility indication response message sent by the server. The response message contains state information confirmation information. Each bit in the state information confirmation information represents a result of confirmation for state information of a corresponding location. For example, if the value of bit 0 in the state information confirmation information received by the terminal is 1, it represents that the server successfully confirms the state of the terminal. If the corresponding state information confirmation information received by the terminal is 0, it represents that the server fails to confirm the terminal state.

Accordingly, the server can timely acquire the state information related to mobility of the terminal device, so that the server can adopt a corresponding network scheduling strategy when necessary, thus avoiding wasting network resources and improving the interaction efficiency between the terminal and the server.

Figure 4:
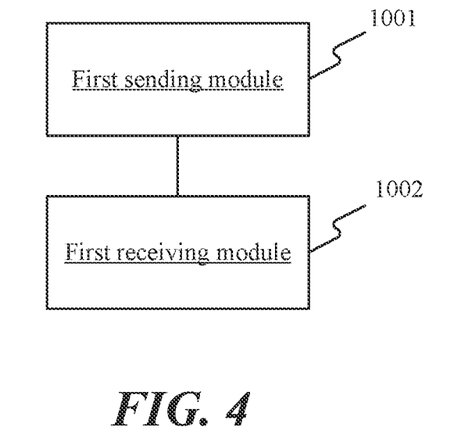
FIG. 4 is a schematic diagram of an exemplary terminal, consistent with some embodiments of the present disclosure.

FIG. 4 is a schematic diagram of an exemplary terminal, consistent with some embodiments of the present disclosure. The terminal can include a first sending module 1001 and a first receiving module 1002.

First sending module 1001 is configured to send a first message to the server, the first message including command information, the command information including first state information, and the first state information including at least one of mobile attribute information, stationary attribute information, moving state information, stationary state information, mobile state start information, stationary state start information, and moving direction state information, wherein the mobile attribute information is used to indicate that the terminal is a mobile terminal, the stationary attribute information is used to indicate that the terminal is a stationary terminal, the moving state information is used to indicate that the terminal is currently in a mobile state, the stationary state information is used to indicate that the terminal is currently in a stationary state, the mobile state start information is used to indicate that the terminal is currently being switched from a stationary state to a mobile state, the stationary state start information is used to indicate that the terminal is currently being switched from a mobile state to a stationary state, and the moving direction information is used to indicate direction information of the terminal's movement.

Specifically, the terminal is a LoRaWAN terminal. The server is a LoRaWAN server. The first message is any uplink data frame. The command information is a MAC Command. For example, the MAC command can be a terminal mobility indication (Device Mobility Indication, DevMobilityInd) command. The terminal mobility indication command can include one or more pieces of state information (StateInfo). FIG. 3 shows a payload part of the terminal mobility indication command. Bit 0 represents whether the terminal is a terminal with a mobile attribute. For example, if the value of bit 0 is 1, it indicates that the terminal is a mobile terminal. For example, the mobile terminal can be a terminal with a mobility requirement, such as a shared bicycle. If the value of bit 0 is 0, it indicates that the terminal is a stationary terminal. Bit 1 represents whether the terminal is currently in a stationary state. If the value of bit 1 is 1, it indicates that the terminal is currently in a stationary state. In contrast, if the value of bit 1 is 0, it indicates that the terminal is currently in a mobile state. Bit 2 represents whether the terminal starts to move from being stationary. For example, if the value of bit 2 is 1, it indicates that the terminal will start to transition from a stationary state to a mobile state. Otherwise, it indicates that the terminal will continue to remain stationary. When a network side learns that the terminal has changed from the stationary state to the mobile state, the network side switches a scheduling strategy for the node, for example, adjusting power to the maximum to achieve maximum reliability and reduce energy saving requirements, or stopping dynamic scheduling of the node. Bit 3 indicates whether the terminal changes from moving to stationary. For example, if the value of bit 3 is 1, it indicates that the terminal will start to transition from a mobile state to a stationary state. The network side learns that the terminal changes from a mobile state to a stationary state, and the network side switches a scheduling strategy for the terminal, for example, adjusting power to the minimum according to a signal condition of the terminal and the network to achieve the minimum power consumption. Optionally, the state information represented by the bit value 1 or 0 can also be interchanged. For example, when the value of bit 0 is 0, it can also represent that the terminal is a mobile terminal. When the value of bit 0 is 1, it represents that the terminal is a stationary terminal.

Optionally, the terminal mobility indication command can also include terminal moving speed information. For example, bits 4-5 in the above drawing can indicate moving speed information of the terminal. For example, when bits 4-5 are 00, it represents that the terminal is moving at a low speed. When bits 4-5 are 01, it indicates that the terminal is moving at a medium speed. When bits 4-5 are 10, it indicates that the terminal is moving at a high speed. After acquiring the moving speed of the terminal, the server can modify the scheduling strategy for the terminal. For example, when the terminal is in a low-speed state, a transmission period of uplink data frames for updating a downlink base station can be appropriately prolonged. When the terminal is in a medium-speed or high-speed state, the transmission period of uplink data frames for updating the downlink base station can be appropriately shortened.

Optionally, the terminal mobility indication command can also include moving direction information. For example, bits 4-5 in the above drawing can indicate terminal moving direction information. For example, when bits 4-5 are 00, it represents that the terminal is moving northward. When bits 4-5 are 01, it represents that the terminal is moving westward. When bits 4-5 are 10, it represents that the terminal is moving southward. When bits 4-5 are 11, it represents that the terminal is moving eastward. After acquiring the moving direction of the terminal, the server can modify the scheduling strategy for the terminal. For example, after acquiring the location information and moving direction information of the terminal, the server can predict a designated base station that can reach the terminal and send downlink data frames to the terminal through the base station.

Optionally, one terminal mobility indication command can include multiple pieces of state information. For example, in a payload part of the terminal mobility indication command, bits 0 and 2 are both set to 1, indicating that the terminal is a terminal with a mobile attribute, and the terminal will start to transition from a stationary state to a mobile state.

First receiving module 1002 is configured to receive a second message sent by the server, wherein the second message is used to confirm the at least one type of first state information in the command information.

Specifically, the second message can be a terminal mobility indication response message (Device Mobility Configuration, DevMobilityConf), and the response message carries confirmation information corresponding to state information on a response bit in the terminal mobility indication command. For example, in the payload of the terminal mobility indication command sent by the terminal to the server, bit 0 is set to 1, indicating that the terminal is a terminal with a mobile attribute. Subsequently, the terminal receives the terminal mobility indication response message sent by the server. The response message contains state information confirmation information. Each bit in the state information confirmation information represents a result of confirmation for state information of a corresponding location. For example, if the value of bit 0 in the state information confirmation information received by the terminal is 1, it represents that the server successfully confirms the state of the terminal. If the corresponding state information confirmation information received by the terminal is 0, it represents that the server fails to confirm the terminal state.

Accordingly, the server can timely acquire the state information related to mobility of the terminal device, so that the server can adopt a corresponding network scheduling strategy when necessary, thus avoiding wasting network resources and improving the interaction efficiency between the terminal and the server.

Figure 5:
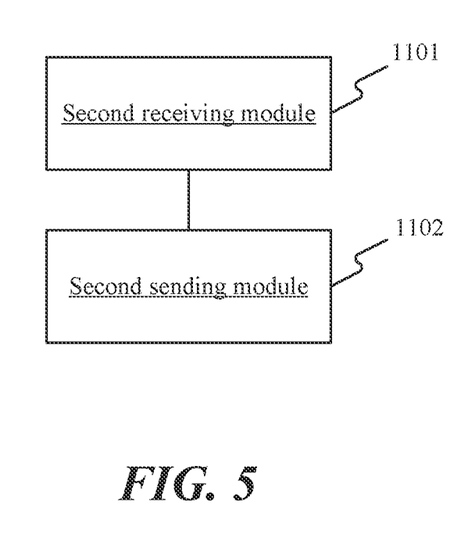
FIG. 5 is a schematic diagram of an exemplary server, consistent with some embodiments of the present disclosure.

FIG. 5 is a schematic diagram of an exemplary server, consistent with some embodiments of the present disclosure. The server can include a second receiving module 1101 and a second sending module 1102.

A second receiving module 1101 is configured to receive a first message sent by a terminal, the first message including command information, the command information including first state information, and the first state information including at least one of mobile attribute information, stationary attribute information, moving state information, stationary state information, mobile state start information, stationary state start information, and moving direction state information, wherein the mobile attribute information is used to indicate that the terminal is a mobile terminal, the stationary attribute information is used to indicate that the terminal is a stationary terminal, the moving state information is used to indicate that the terminal is currently in a mobile state, the stationary state information is used to indicate that the terminal is currently in a stationary state, the mobile state start information is used to indicate that the terminal is currently being switched from a stationary state to a mobile state, the stationary state start information is used to indicate that the terminal is currently being switched from a mobile state to a stationary state, and the moving direction information is used to indicate direction information of the terminal's movement.

Specifically, the terminal is a LoRaWAN terminal. The server is a LoRaWAN server. The first message is any uplink data frame. The command information is a MAC Command. For example, the MAC command can be a terminal mobility indication (Device Mobility Indication, DevMobilityInd) command. The terminal mobility indication command can include one or more pieces of state information (StateInfo). FIG. 3 shows a payload part of the terminal mobility indication command. Bit 0 represents whether the terminal is a terminal with a mobile attribute. For example, if the value of bit 0 is 1, it indicates that the terminal is a mobile terminal. For example, the mobile terminal can be a terminal with a mobility requirement such as a shared bicycle. If the value of bit 0 is 0, it indicates that the terminal is a stationary terminal. Bit 1 represents whether the terminal is currently in a stationary state. If the value of bit 1 is 1, it indicates that the terminal is currently in a stationary state. In contrast, if the value of bit 1 is 0, it indicates that the terminal is currently in a mobile state. Bit 2 represents whether the terminal starts to move from being stationary. For example, if the value of bit 2 is 1, it indicates that the terminal will start to transition from a stationary state to a mobile state. Otherwise, it indicates that the terminal will continue to remain stationary. When a network side learns that the terminal has changed from the stationary state to the mobile state, the network side switches a scheduling strategy for the node, for example, adjusting power to the maximum to achieve maximum reliability and reduce energy saving requirements, or stopping dynamic scheduling of the node. Bit 3 indicates whether the terminal changes from moving to stationary. For example, if the value of bit 3 is 1, it indicates that the terminal will start to transition from a mobile state to a stationary state. The network side learns that the terminal changes from a mobile state to a stationary state, and the network side switches a scheduling strategy for the terminal, for example, adjusting power to the minimum according to a signal condition of the terminal and the network to achieve the minimum power consumption. Optionally, the state information represented by the bit value 1 or 0 can also be interchanged. For example, when the value of bit 0 is 0, it can also represent that the terminal is a mobile terminal. When the value of bit 0 is 1, it represents that the terminal is a stationary terminal.

Optionally, the terminal mobility indication command can also include terminal moving speed information. For example, bits 4-5 in the above drawing can indicate moving speed information of the terminal. For example, when bits 4-5 are 00, it represents that the terminal is moving at a low speed. When bits 4-5 are 01, it indicates that the terminal is moving at a medium speed. When bits 4-5 are 10, it indicates that the terminal is moving at a high speed. After acquiring the moving speed of the terminal, the server can modify the scheduling strategy for the terminal. For example, when the terminal is in a low-speed state, a transmission period of uplink data frames for updating a downlink base station can be appropriately prolonged. When the terminal is in a medium-speed or high-speed state, the transmission period of uplink data frames for updating the downlink base station can be appropriately shortened.

Optionally, the terminal mobility indication command can also include moving direction information. For example, bits 4-5 in the above drawing can indicate terminal moving direction information. For example, when bits 4-5 are 00, it represents that the terminal is moving northward. When bits 4-5 are 01, it represents that the terminal is moving westward. When bits 4-5 are 10, it represents that the terminal is moving southward. When bits 4-5 are 11, it represents that the terminal is moving eastward. After acquiring the moving direction of the terminal, the server can modify the scheduling strategy for the terminal. For example, after acquiring the location information and moving direction information of the terminal, the server can predict a designated base station that can reach the terminal and send downlink data frames to the terminal through the base station.

Optionally, one terminal mobility indication command can include multiple pieces of state information. For example, in a payload part of the terminal mobility indication command, bits 0 and 2 are both set to 1, indicating that the terminal is a terminal with a mobile attribute, and the terminal will start to transition from a stationary state to a mobile state.

Second sending module 1102 is configured to send a second message, wherein the second message is used to confirm the at least one type of first state information in the command information.

Specifically, the second message can be a terminal mobility indication response message (Device Mobility Configuration, DevMobilityConf), and the response message carries confirmation information corresponding to state information on a response bit in the terminal mobility indication command. For example, in the payload of the terminal mobility indication command sent by the terminal to the server, bit 0 is set to 1, indicating that the terminal is a terminal with a mobile attribute. Subsequently, the terminal receives the terminal mobility indication response message sent by the server. The response message contains state information confirmation information. Each bit in the state information confirmation information represents a result of confirmation for state information of a corresponding location. For example, if the value of bit 0 in the state information confirmation information received by the terminal is 1, it represents that the server successfully confirms the state of the terminal. If the corresponding state information confirmation information received by the terminal is 0, it represents that the server fails to confirm the terminal state.

Accordingly, the server can timely acquire the state information related to mobility of the terminal device, so that the server can adopt a corresponding network scheduling strategy when necessary, thus avoiding wasting network resources and improving the interaction efficiency between the terminal and the server.

The embodiments of this disclosure also provide an apparatus, including: one or more processors; and one or more machine-readable media having instructions stored thereon, wherein when executed by the one or more processors, the instructions cause the apparatus to perform the method described in the embodiments of this disclosure.

The embodiments of this disclosure also provide one or more machine-readable media having instructions stored thereon, wherein when executed by one or more processors, the instructions cause an apparatus to perform the method described in the embodiments of this disclosure.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

What is claimed is:

1. A method for communication by a terminal, comprising:
sending a first message to a server, the first message comprising command information, the command information comprising first state information of the terminal, and the first state information comprising at least one of mobile attribute information, moving state information, mobile state start information, stationary state start information, or moving direction state information,
wherein the mobile attribute information is used to indicate that the terminal is a mobile terminal, the moving state information is used to indicate that the terminal is in a mobile state, the mobile state start information is used to indicate a transition of the terminal from a stationary state to a mobile state, the stationary state start information is used to indicate a transition of the terminal from a mobile state to a stationary state, and the moving direction information is used to indicate direction information of movement of the terminal,
wherein the first state information is sent to the server for the server to adjust a network scheduling operation based on the first state information; and
receiving a second message sent by the server, wherein the second message is used to confirm the at least one of first state information in the command information.

2. The method according to claim 1, wherein
at least one of the mobile state start information or the stationary state start information is sent to the server for the server to adjust an output power of the terminal based on the at least one of the mobile state start information or the stationary state start information.

3. The method according to claim 1, wherein
the first state information further comprises moving speed information of the terminal, and the moving speed information is sent to the server for the server to adjust a transmission period of the terminal based on the moving speed information.

4. The method according to claim 1, wherein
the moving direction information of the terminal is sent to the server for the server to determine a first base station for sending data frames to the terminal through the first base station.

5. The method according to claim 1, wherein
the mobile attribute information is sent to the server for the server to allocate a downlink channel for the terminal based on the mobile attribute information.

6. The method according to claim 1, wherein the first state information further comprises at least one of a first time information associated with a transition from a mobile state to a stationary state, or a second time information associated with a transition from a stationary state to a mobile state.

7. A terminal comprising:
a memory storing a set of instructions; and
one or more processors configured to execute the set of instructions to cause the terminal to perform:
sending a first message to a server, the first message comprising command information, the command information comprising first state information of the terminal, and the first state information comprising at least one of mobile attribute information, moving state information, mobile state start information, stationary state start information, or moving direction state information,
wherein the mobile attribute information is used to indicate that the terminal is a mobile terminal, the moving state information is used to indicate that the terminal is in a mobile state, the mobile state start information is used to indicate a transition of the terminal from a stationary state to a mobile state, the stationary state start information is used to indicate a transition of the terminal from a mobile state to a stationary state, and the moving direction information is used to indicate direction information of movement of the terminal,
the first state information is sent to the server for the server to adjust a network scheduling operation based on the first state information; and
receiving a second message sent by the server, wherein the second message is used to confirm the at least one of first state information in the command information.

8. The terminal according to claim 7, wherein
at least one of the mobile state start information or the stationary state start information is sent to the server for the server to adjust an output power of the terminal based on the at least one of the mobile state start information or the stationary state start information.

9. The terminal according to claim 7, wherein
the first state information further comprises moving speed information of the terminal, and the moving speed information is sent to the server for the server to adjust a transmission period of the terminal based on the moving speed information.

10. The terminal according to claim 7, wherein
the moving direction information of the terminal is sent to the server for the server to determine a first base station for sending data frames to the terminal through the first base station.

11. The terminal according to claim 7, wherein
the mobile attribute information is sent to the server for the server to allocate a downlink channel for the terminal based on the mobile attribute information.

12. A non-transitory computer readable medium that stores a set of instructions that is executable by at least one processor of a terminal to cause the terminal to perform a method for communication, the method comprising:
sending a first message to a server, the first message comprising command information, the command information comprising first state information of the terminal, and the first state information comprising at least one of mobile attribute information, moving state information, mobile state start information, stationary state start information, or moving direction state information,
wherein the mobile attribute information is used to indicate that the terminal is a mobile terminal, the moving state information is used to indicate that the terminal is in a mobile state, the mobile state start information is used to indicate a transition of the terminal from a stationary state to a mobile state, the stationary state start information is used to indicate a transition of the terminal from a mobile state to a stationary state, and the moving direction information is used to indicate direction information of movement of the terminal,
wherein the first state information is sent to the server for the server to adjust a network scheduling operation based on the first state information; and
receiving a second message sent by the server, wherein the second message is used to confirm the at least one of first state information in the command information.

13. The non-transitory computer readable medium according to claim 12, wherein
at least one of the mobile state start information or the stationary state start information is sent to the server for the server to adjust an output power of the terminal based on the at least one of the mobile state start information or the stationary state start information.

14. The non-transitory computer readable medium according to claim 12, wherein
the first state information further comprises moving speed information of the terminal, and the moving speed information is sent to the server for the server to adjust a transmission period of the terminal based on the moving speed information.

15. The non-transitory computer readable medium according to claim 12, wherein
the moving direction information of the terminal is sent to the server for the server to determine a first base station for sending data frames to the terminal through the first base station.

16. The non-transitory computer readable medium according to claim 12, wherein
the mobile attribute information is sent to the server for the server to allocate a downlink channel for the terminal based on the mobile attribute information.

17. The non-transitory computer readable medium according to claim 12, wherein
the first state information further comprises at least one of a first time information associated with a transition from a mobile state to a stationary state, or a second time information associated with a transition from a stationary state to a mobile state.

\* \* \* \* \*